United States Patent Office 3,490,416
Patented Jan. 20, 1970

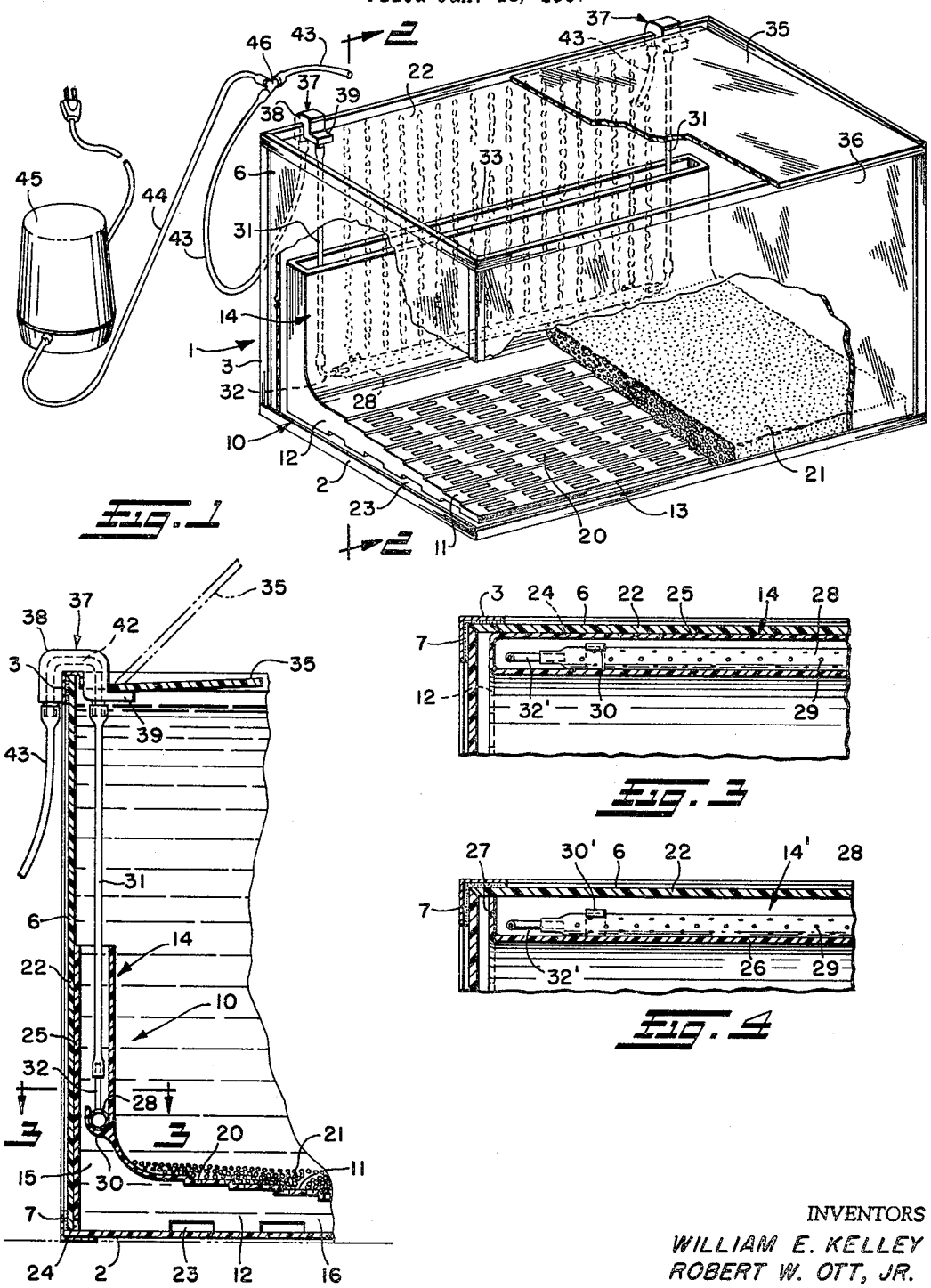

3,490,416
AQUARIUM
William E. Kelley, Euclid, and Robert W. Ott, Jr., South Euclid, Ohio, assignors to Aquarium Systems, Inc., Wickliffe, Ohio, a corporation of Ohio
Filed Jan. 18, 1967, Ser. No. 610,114
Int. Cl. A01k *64/00*
U.S. Cl. 119—5                                  19 Claims

ABSTRACT OF THE DISCLOSURE

An aquarium in which there is submerged a filter having an elongated air discharge manifold contained in an air discharge nozzle of substantial length which emits a continuous curtain of air bubbles to cause circulation of water through filtrant and underfiltrant plate supporting same back into the tank. Support brackets on edge of aquarium support a coverplate in an inclined position and provide means for supplying air to the discharge manifold.

---

The present invention relates generally as indicated to an aquarium and more particularly to an improved filter for effectively cleaning, aerating and purifying the water in an aquarium.

As is well known, the water of an aquarium, whether it be fresh water or sea water, must be maintained substantially free of organic waste matter and toxic gases to insure the survival and health of the aquatic life contained therein. Several different types of filters and aerators have been developed which have met with varying degrees of success in maintaining the desired water conditions, but in general they have not proven to be entirely satisfactory either because they do not have sufficient water circulating capacity to achieve the desired cleanliness or the equipment is too expensive to manufacture, too costly to operate, or too difficult to clean.

It is accordingly a primary object of this invention to provide a filter for aquarium use which is relatively inexpensive to manufacture and operate, may be easily disassembled for cleaning, and creates an increased rate of flow of the water medium for increased filtering, aerating and purifying of the water as compared to similar commercially available units. These and other objects are achieved by a filter generally comprising an elongated discharge nozzle submerged in the water and having an air discharge manifold of substantial length contained therein which emits a continuous curtain of air bubbles, causing circulation of the water through an apertured underfiltrant plate and filtrant covering the same and back out the nozzle into the tank.

Another object is to provide such a filter with a perforated underfiltrant plate which slopes upwardly toward the discharge nozzle to define therebeneath an increasingly larger passage for flow of water through the underfiltrant plate to the discharge nozzle.

Still another object is to provide such a filter in which the underfiltrant plate may be stepped, corrugated, or otherwise nonplanar to thereby substantially eliminate any tendency of the filtrant supported thereby to slide down the plate.

A further object is to provide in combination with an aquarium and filter of the type described, novel support brackets for supporting a cover plate on the aquarium in an inclined position to facilitate running of condensation on the underside of the cover plate back into the aquarium, and passages in the support brackets through which the air discharge manifold may be connected to an air source.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is a perspective view of an aquarium of conventional type partially broken away to show a preferred form of filter constructed in accordance with this invention contained within the aquarium;

FIG. 2 is a fragmentary vertical section through the tank and filter of FIG. 1 taken on the plane of the line 2—2;

FIG. 3 is a fragmentary horizontal section taken on the plane of the line 3—3, FIG. 2, showing the configuration of the air discharge manifold and discharge nozzle; and FIG. 4 is a view similar to FIG. 3 in which the discharge nozzle has been slightly modified.

Referring now in detail to the drawing and first especially to FIG. 1, there is illustrated an aquarium 1 which may be a standard tank for home use having a base 2 with a rectangular box-like frame 3 extending upwardly therefrom for supporting glass walls 6. The lower edges and corners of the aquarium 1 may be sealed with a suitable caulking compound 7. A refrigeration coil and/or heater, not shown, may be associated with the aquarium to maintain the water at the proper temperature for the aquatic life inhabiting the same.

Disposed within the aquarium tank 1 is a preferred form of filter 10 constructed in accordance with this invention which comprises an underfiltrant plate 11 having end plates 12 for maintaining the same in spaced relation from the base 2 and an elongated narrow vertically and longitudinally extending discharge nozzle 14 of generally rectangular shape defining an air lift chamber 15 in direct fluid communication with the water passage 16 beneath the underfilament plate 11. The underfiltrant plate 11 has a multitude of openings 20 therein preferably in the form of narrow slots for permitting water to flow downwardly through the openings into the passage 16 after having first passed through a layer of filtrant 21 covering the the underfiltrant plate 11. The underfiltrant plate 11 has filtrant plate 11 is desirably closely spaced from the base 2 of the aquarium so that it occupies as little of the aquarium as possible and does not obstruct the view from the front of the aquarium, but the plate 11 slopes upwardly in the direction of the nozzle 14 to provide for increasing flow capacity in the passage 16 for the water entering through the slots 20. Moreover, the sloping plate 14 permits the layer of filtrant 21 covering the same to be of generally uniform depth and yet having a sloping surface which will appear to be flat when viewed through the glass walls 6 of the tank and water contained therein due to the refraction of the light. Any tendency of the filtrant 21 to slide down the plate 11 may be substantially eliminated by providing horizontal steps in the sloping plate as shown or providing some other nonplanar surface such as a corrugated surface, for example.

Desirably, the underfiltrant plate 11 overlies substantially the entire area of the base 2 of the aquarium 1 except for that portion covered by the nozzle 14, and both the nozzle 14 and the underfiltrant plate 11 extend substantially the full length of the aquarium, for a purpose which will become apparent in the discussion to follow.

The filter 10 is primarily designed for use with aquariums such as may be found in the home, and since their dimensions vary, for maximum use it is preferred that the exterior dimensions of the filter be such that it will fit into a standard aquarium having the smallest dimensional length and/or width for a given capacity. Thus, when the filter 10 is used in conjunction with an aquarium tank having a greater length and/or width than the filter, the filter should be positioned in the aquarium with the nozzle 14 flush against the back wall 22 of the aquarium and filtrant 21 placed along the sides and front of the underfiltrant plate 11 as well as on top of the same. However, it should be apparent that the dimensions of the filter 10 may be varied as desired to fit other sizes of aquariums as well. Moreover, the nozzle 14 need not necessarily be placed against the back wall of the aquarium; it could be spaced a slight distance therefrom or even placed in the middle of the aquarium if desired, with an underfiltrant plate extending from one or both sides of the nozzle.

Slots 23 in the end plates 12 permit circulation of water adjacent the sides of the aquarium through the filtrant into the water passage 16, and additional slots 24 may be provided in the back wall 25 of the nozzle 14 to prevent water from being trapped between the nozzle and back wall 22 of the aquarium. Alternatively, the back wall 25 of the nozzle may be eliminated as shown in FIG. 4, leaving a front wall 26 and sides 27 and an open back which is closed by the back wall 22 of the aquarium to define a nozzle 14'.

Contained within the air lift chamber 15 of the nozzle 14, preferably adjacent the lower portion thereof, there is an air discharge manifold 28 in the form of an elongated tube extending substantially the full length of the nozzle and having a multiplicity of closely spaced apertures 29 therein along its entire length. The air discharge manifold 28 is removably held in place by inserting the same into a pair of spaced apart upwardly opening semi-circular supports 30 attached to the inner surface of the nozzle. The supports 30 are made of a flexible plastic material thereby permitting ready removal of the manifold 28 from the supports as when it is desired to clean the nozzle 14 and manifold simply by pulling on semi-rigid or rigid air lines 31 which may be integral with the manifold or press fitted onto air inlet tubes 32 projecting outwardly from the ends of the manifold as shown. Alternatively, the supports 30 may be eliminated altogether and the manifold 28 supported within the nozzle 14 solely by the air lines 31.

The inner diameter of the air inlet tubes 32 and inner diameter of the manifold 28 are substantially greater than the diameter of the apertures 29 in the manifold to provide a substantial volume of air within the manifold for uniform discharge of a large number of air bubbles from the apertures 29. Accordingly, as air is supplied to the discharge manifold 28, a curtain of air bubbles will be continually emitted and directed by the nozzle 14 toward the upper water level, creating a very attractive appearance and causing circulation of the water in known manner through the nozzle 14 back into the tank. Because of the large volume of air bubbles passing through the nozzle 14 along substantially the full length of the aquarium, the filter 10 of the present invention produces a substantially greater rate of flow of the water than comparable air lift filtering devices on the market. The height of the nozzle 14 in proportion to the depth of the water may vary, but to achieve maximum flow the nozzle outlet 33 should not be submerged more than a few inches below the upper water level, and the longitudinal length of the nozzle is ordinarily substantially greater than its vertical height as shown.

The filter 10 may be used to condition both fresh water and salt water, the only difference being the type of filtrant 21 used. For a fresh water aquarium, the filtrant 21 may consist of sand or gravel or a combination of both.

In salt water aquariums, however, the filtrant may consist of a particulate material such as coral gravel or crushed oyster shells disclosed in the co-pending application of William E. Kelley and Jessop Smith, Ser. No. 492,693, filed Oct. 4, 1964. In any event, as the water passes through the filtrant 21, the organic matter contained in the water is drawn into the filtrant where it is converted by bacteria into non-toxic waste products.

The rising curtain of air bubbles from the discharge manifold 28, in addition to causing water circulation and creating a very pleasing appearance as aforesaid, aerates the water to provide a high percentage of oxygen saturation while liberating toxic gases such as carbon dioxide, hydrogen sulfide, and ammonia to the atmosphere, and of course the high rate of flow of the circulating water within the aquarium results in more effective filtration and purifying of the water.

As the air bubbles rise to the upper surface of the water, they expand and burst, causing slight splashing. To prevent the water from splashing over the outside of the aquarium tank and onto surrounding furniture and also to reduce the evaporation losses, a cover plate 35 may be provided for the tank. Preferably, the front edge of the cover plate 35 is supported by the upper edge of the front wall 36 of the aquarium, while the rear edge is supported inside the tank slightly below the upper edge of the back wall 22 of the aquarium by support brackets 37 of plastic or like material having U-shape portions 38 which snap onto the edge of the aquarium and horizontally projecting portions 39 upon which the cover plate 35 rests. Accordingly, any condensation which forms on the underside of the cover plate 35 will run down the cover plate back into the tank rather than over the sides. The horizontal projections 39 on the brackets 37 further provide a surface about which the cover plate 35 may be pivoted as shown in phantom lines in FIG. 2 when it is desired to raise the cover plate to permit access to the interior of the tank.

The support brackets 37, in addition to supporting an edge of the cover plate 35, may be provided with air passages 42 in the U-shape portion 38 whose ends may be suitably connected to the air lines 31 leading to the air discharge manifold 28 and other air lines 43 which may be connected to the discharge line 44 of an air pump 45 of suitable type through a T-connection 46. However, it should be apparent that the air lines 31, 43 could be directly connected together or of a single piece and provided with a U-shape bend for engagement with the upper edge of the aquarium, if desired.

The filter 10 is desirably molded in one piece from a transparent plastic material of suitable type, but it should be understood that other types of materials not toxic to aquatic life which will resist attack from the water medium may be used, and the nozzle 14 and underfiltrant plate 11 may be separate parts which are later assembled to permit shipment in knockdown condition. The discharge manifold may likewise be made of plastic or other suitable material, and may be a separate piece to permit assembly and disassembly for cleaning or replacement as aforesaid.

We therefore, particularly point out and distinctly claim as our invention:

1. A filter for use in aquariums and the like comprising an elongated narrow vertically and longitudinally extending discharge nozzle of generally rectangular shape adapted to be placed in a vertical position in an aquarium having its longitudinal length substantially greater than its vertical height, said discharge nozzle defining an elongated air lift chamber, an elongated air discharge manifold contained in said air lift chamber and extending substantially the full longitudinal length of said nozzle for discharge of a continuous curtain of air bubbles into said air lift chamber, an underfiltrant plate projecting outwardly from the lower end of said nozzle and having a passage therebeneath in communication with said air lift chamber, and openings in said plate for permitting entry of water into said passage.

2. The filter of claim 1 wherein said discharge manifold has a multitude of air discharge apertures therein along its length and is in the form of a tube having a diameter substantially greater than the diameter of said apertures therein to provide sufficient air storage for uniform discharge of a large number of air bubbles from said apertures.

3. The filter of claim 1 further comprising air inlet tubes extending into opposite ends of said manifold for supplying air to said manifold.

4. The discharge nozzle of claim 1 wherein said filter is made of transparent plastic material to permit viewing of the curtain of bubbles passing through said nozzle.

5. The filter of claim 1 further comprising end plates on the ends of said underfiltrant plate for supporting said underfiltrant plate in spaced relation from the bottom of an aquarium, upwardly opening semi-circular support means attached to the inner surface of said nozzle into and out of which said manifold is adapted to be resiliently snapped to permit ready disassembly and assembly of said manifold for ease of cleaning of said filter, and air inlet tubes extending into opposite ends of said manifold, said manifold having a multitude of air discharge apertures therein along its length, said air inlet tubes and manifold being of a diameter substantially greater than the diameter of said apertures therein to provide sufficient air for uniform discharge of a large volume of air bubbles from said apertures.

6. In combination, an aquarium having a bottom and sides, and a filter contained within said aquarium, said filter comprising an elongated narrow vertically extending discharge nozzle contained within said aquarium, said discharge nozzle defining an air lift chamber, an air discharge manifold contained in said air lift chamber and extending substantially the full length of said nozzle, an underfiltrant plate projecting outwardly from the lower end of said nozzle in spaced relation from the bottom of said aquarium to provide a passage therebeneath in communication with said air lift chamber, a filtrant covering said underfiltrant plate, openings in said underfiltrant plate for flow of water through said filtrant into said passage therebeneath, and means for supplying air to said manifold for discharge of a continuous curtain of air bubbles from said manifold to effect circulation of the water entering said passage out through said nozzle back into said aquarium.

7. The combination of claim 6 wherein said nozzle extends substantially the full length of the aquarium and is completely submerged.

8. The combination of claim 6 wherein said underfiltrant plate slopes upwardly toward said nozzle to provide an increasingly larger passage therebeneath in the direction of said nozzle for flow of water through said underfiltrant plate to said nozzle.

9. The combination of claim 6 wherein said discharge manifold has a multitude of air discharge apertures therein along its length and is in the form of a tube having a diameter substantially greater than the diameter of said apertures therein to provide sufficient air for uniform discharge of a large volume of air bubbles from said apertures, and upwardly opening semi-circular support means are attached to the inner surface of said nozzle into and out of which said manifold is adapted to be resiliently snapped to permit ready disassembly and assembly of said manifold and nozzle for cleaning and replacement.

10. The combination of claim 6 further comprising a cover plate for said aquarium, and means for supporting said cover plate in an inclined position with the lowest end inside said aquarium below the upper edge thereof, whereby condensation on the underside of said cover plate will run back into said aquarium.

11. The combination of claim 10 wherein said means for supporting said cover plate as aforesaid comprises support brackets which are adapted to be snapped onto the edge of said aquarium, said support brackets being provided with a shoulder which extends into said aquarium below the upper edge thereof for supporting one edge of said cover plate within said aquarium, the opposite edge of said cover plate being supported by an upper edge of said aquarium.

12. The combination of claim 11 further comprising air passages in said support brackets having opposite ends respectively connected to said discharge manifold and an air supply.

13. The combination of claim 6 wherein said nozzle consists of a front wall and sides and an open back which is closed by a wall of the aquarium to define an elongated discharge opening.

14. A filter for use in aquariums and the like comprising an elongated narrow vertically extending discharge nozzle adapted to be placed in a vertical position in an aquarium, said discharge nozzle defining an elongated air lift chamber, an elongated air discharge manifold contained in said air lift chamber and extending substantially the full length of said nozzle for discharge of a continuous curtain of air bubbles into said air lift chamber, an underfiltrant plate projecting outwardly from the lower end of said nozzle and having a passage therebeneath in communication with said air lift chamber, and openings in said plate for permitting entry of water into said passage, and upwardly opening semi-circular support means attached to the inner surface of said nozzle into and out of which said manifold is adapted to be resiliently snapped to permit ready assembly and disassembly of said manifold and nozzle for cleaning and replacement of parts.

15. A filter for use in aquariums and the like comprising an elongated narrow vertically extending discharge nozzle adapted to be placed in a vertical position in an aquarium, said discharge nozzle defining an elongated air lift chamber, an elongated air discharge manifold contained in said air lift chamber and extending substantially the full length of said nozzle for discharge of a continuous curtain of air bubbles into said air lift chamber, an underfiltrant plate projecting outwardly from the lower end of said nozzle and having a passage therebeneath in communication with said air lift chamber, and openings in said plate for permitting entry of water into said passage, said underfiltrant plate sloping upwardly toward said nozzle to provide an increasingly larger passage therebeneath in the direction of said nozzle for flow of water through said underfiltrant plate to said nozzle.

16. The filter of claim 15 wherein said underfiltrant plate has a nonplanar surface which reduces the tendency of filtrants covering said plate from sliding down the same.

17. The filter of claim 15 wherein said underfiltrant plate is horizontally stepped to reduce the tendency of filtrants covering said underfiltrant plate from sliding down the same.

18. The filter of claim 15 further comprising end plates on the ends of said underfiltrant plate for supporting said underfiltrant plate in such sloping relation to the bottom of an aquarium, said end plates having openings therein to permit circulation of water through said end plates into said passage.

19. A filter for use in aquariums and the like comprising an elongated narrow vertically extending discharge nozzle adapted to be placed in a vertical position in an aquarium, said discharge nozzle defining an elongated air lift chamber, an elongated air discharge manifold contained in said air lift chamber and extending substantially the full length of said nozzle for discharge of a continuous curtain of air bubbles into said air lift chamber, an underfiltrant plate projecting outwardly from the lower end of said nozzle and having a passage therebeneath in communication with said air lift chamber, and openings in said plate for permitting entry of water into said passage, said nozzle consisting of a front wall and sides and an open back adapted to be closed by a wall of the aqarium to define an elongated discharge opening.

References Cited

UNITED STATES PATENTS

| | | | |
|---|---|---|---|
| 950,999 | 3/1910 | Erlwein et al. | 210—169 X |
| 2,748,075 | 5/1956 | Hovlid. | |
| 2,935,199 | 5/1960 | Willinger | 210—169 |
| 3,101,564 | 8/1963 | Stoessel | 119—5 X |
| 3,119,774 | 1/1964 | Arak | 210—169 |
| 3,294,239 | 12/1966 | Dayes | 119—5 X |
| 3,326,185 | 6/1967 | Perez | 119—5 |
| 3,387,587 | 6/1968 | Kelley et al. | 119—2 |

FOREIGN PATENTS 1,204,013  10/1965  Germany.

HUGH R. CHAMBLEE, Primary Examiner

U.S. Cl. X.R.

210—169